United States Patent [19]

Lee

[11] Patent Number: 4,938,627
[45] Date of Patent: Jul. 3, 1990

[54] METHOD OF SLIPLINER GROUTING

[75] Inventor: Lindsey D. Lee, Houston, Tex.

[73] Assignee: Halliburton Company, Ducan, Okla.

[21] Appl. No.: 320,687

[22] Filed: Mar. 7, 1989

Related U.S. Application Data

[63] Continuation-in-part of Ser. No. 247,150, Sep. 21, 1988, Pat. No. 4,889,449.

[51] Int. Cl.$^5$ .................. E02D 29/10; E21F 15/00
[52] U.S. Cl. .................................. 405/154; 138/97; 106/682; 405/156
[58] Field of Search .............. 405/289, 263, 154, 155; 138/97; 106/87, 86, 88

[56] References Cited

U.S. PATENT DOCUMENTS

| | | | |
|---|---|---|---|
| 3,950,461 | 4/1976 | Levens | 138/97 X |
| 4,170,248 | 10/1979 | Bennett et al. | 138/97 |
| 4,304,298 | 12/1981 | Sutton | 106/87 X |
| 4,333,764 | 6/1982 | Richardson | 106/87 |

FOREIGN PATENT DOCUMENTS 2097892 11/1982 United Kingdom ............... 138/97

Primary Examiner—Randolph A. Reese
Assistant Examiner—Arlen L. Olsen
Attorney, Agent, or Firm—James R. Duzan

[57] ABSTRACT

The present invention comprises a method of grouting a slipliner in a sewer or drain pipe using foam cements having a specific gravity less than 1.0 and have adequate compressure strength to maintain the slipliner in position within the sewer or drain pipe.

7 Claims, 4 Drawing Sheets

METHOD OF SLIPLINER GROUTING

BACKGROUND OF THE INVENTION

This application is a continuation-in-part of U.S. patent application Ser. No. 07/247,150, filed Sept. 21, 1988, now U.S. Pat. No. 4,889,449 entitled "Slipliner Grouting Method and System".

This invention relates to inflatable sealing and positioning devices used in grouting operations. More specifically, the invention relates to inflatable grouting bags for use in slipliner grouting operations for the repair of sewer and drain pipes.

Many cities and municipal utility districts are having to repair sanitary and storm sewers. A leaking sewer will typically allow sand, clays, silts and other materials to seep into the sewer. The subsequent flow of water through the sewer carries such materials away so that with time voids are created around the exterior of the sewer which are not usually noticed until buildings, roadways or houses are either damaged or in danger of damage due to subsidence.

Alternately, sewer failure may be caused by the chemical attack of the sewer or improper installation of the sewer.

With respect to chemical attack, sanitary sewers and, ocassionally, storm sewers will be subjected to corrosive gases, such as hydrogen sulfide. Typically, concrete sewers are lined with a corrosion proof liner of flexible plastic which, when intact, prevents the corrosion of the sewer. When the corrosion liner fails, it ultimately allows the attack and failure of the sewer with subsequent exchange of fluids and solids between the sewer and surrounding earth.

Regarding improper installation of the sewer, if jointed reinforced concrete sewer pipe is improperly installed, buoyancy and gravity forces on the sewer pipe may cause damage to the sewer pipe, cause sewer pipe movement and may cause sewer pipe joints to open thereby allowing the exchange of fluid and solids with the surrounding earth.

A typical repair procedure for sewers involves the placement of a liner pipe of plastic material, such as fiberglass, smooth wall polyethylene, or composites of polyethylene and polyproplene, inside the existing sewer. After the plastic material pipe has been placed inside the sewer, the annulus between the liner pipe and sewer is filled with a cementitious grout. This procedure of lining the sewer is commonly called slip lining.

As most slip lining operations are carried out with the sewer in service, the slip liner is installed with fluid flowing through the sewer, slip liner and annulus. After the ends of the sewer and slip liner are mechanically sealed, the fluid flow is diverted into the slip liner, and the annular space between the slip liner and sewer, being partially filled with water, can be grouted.

One prior art slip liner grouting job which involved the use of large diameter HDPE pipe to line a sewer used air to foam a grout slurry. The grout proportions and air content in the grout slurry lead to a grout density or specific gravity of approximately 0.7.

Another prior art grouting job involved the use of low-density cellular concrete to backfill several utilities during reconstruction of the New England Thruway. The low-density cellular concrete had a maximum specific gravity of approximately 0.67 and a minimum 28-day compressive strength of 100 pounds per square inch (p.s.i.)

SUMMARY OF THE INVENTION

The present invention relates to the use of foam cement in methods of grouting a slipliner in a sewer or drain pipe to repair the same. The present invention comprises a method of grouting a slipliner in a sewer or drain pipe using foam cements having a specific gravity less than 1.0 and have adequate compressure strength to maintain the slipliner in position within the sewer or drain pipe.

DESCRIPTION OF THE INVENTION

Figure 1:
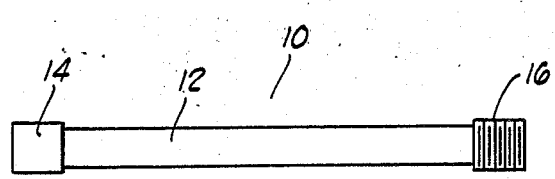
FIG. 1 is a view of a grout container.

Referring to FIG. 1, a grout bag 10 is shown. The grout bag 10 comprises a flexible inflatable bag 12, female coupling 14 and male coupling 16. The flexible inflatable bag 12 may be constructed of cloth-like canvas material, reinforced elastomeric material, etc. The grout bags 10 may be of any convenient length, although a length of five (5) to ten (10) feet is preferred. The female 14 and male 16 couplings may be of any size, although a one (1) inch diameter coupling is preferred.

Figure 2:
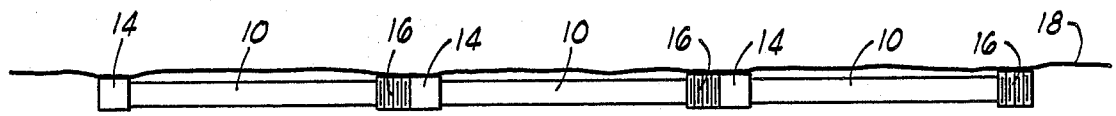
FIG. 2 is a view of a plurality of interconnected grout bags.

Referring to FIG. 2, a plurality of grout bags 10 are shown being interconnected by their couplings 14 and 16 as well as a cable 18 secured to portions of the couplings 14 and 16.

Figure 3:
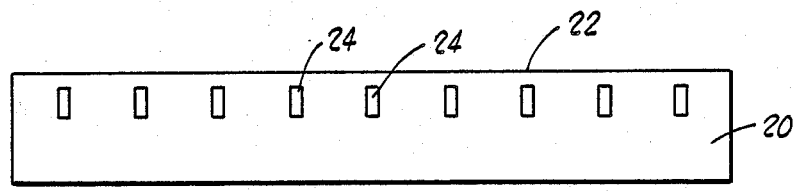
FIG. 3 is a view of the grout container protector.

Referring to FIG. 3, a grout bag protector 20 is shown. The grout bag protector 20 comprises an enlongated rectangular piece of material which is folded in half about its centerline 22 having a plurality of slots 24 in each half of the material near the centerline 22 thereof. The grout bag protector 20 may be formed from any suitable material such as thin plastic, plastic laminated cardboard, etc. The purpose of the grout bag protector 20 is to protect the grout bag 10 from damage during installation of the grout bag 10 in a sewer.

Figure 4:
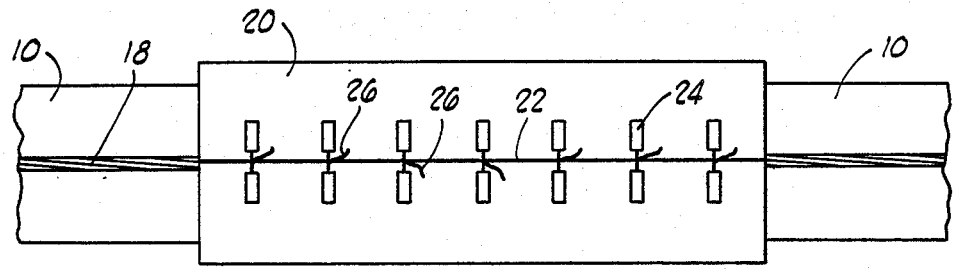
FIG. 4 is a view of the grout container protector installed on a grout container.

Referring to FIG. 4, a grout bag protector 20 is shown installed over a plurality of grout bags 10 being secured in position by securing the grout bag protector through the use of ties 26 through slots 24 of the protector 20 wrapped about and tied to cable 18 secured to the grout bags 10.

Figure 5:
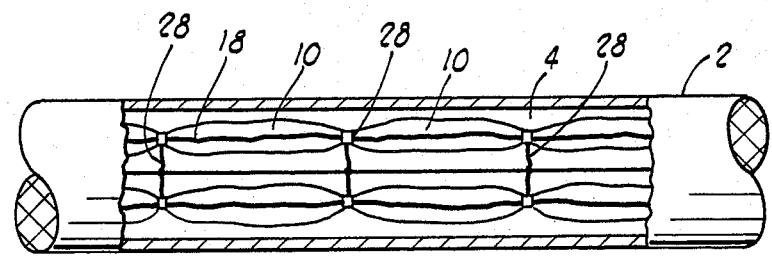
FIG. 5 is a top view of the grout containers without grout container protectors installed between a slip liner and sewer.

Referring to FIG. 5, a plurality of grout bags 10 are shown installed in a sewer 2 having a slip liner 4 therein with the grout protectors 20 being removed from the grout bags 10. Two rows of lines of grout bags 10 are shown being installed on the top of the slip liner 4 to prevent the slip liner 4 from floating in the sewer 2 during grouting operations permanently installing the slip liner 4 in the sewer 2. To keep each row or line of grout bags 10 in position on top of the slip liner 4 cross-connecting cables 28 have been intermittently installed to tie or interconnect each row of grout bags 10.

Figure 6:
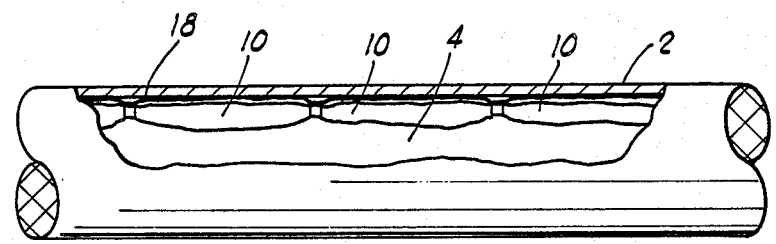
FIG. 6 is a side view of the grout containers without grout container protectors installed between a slip liner and sewer.

Referring to FIG. 6, a row or line of grout bags 10 interconnected by cable 18 are shown on one side of a slip liner 4 installed in a sewer 2.

Figure 7:
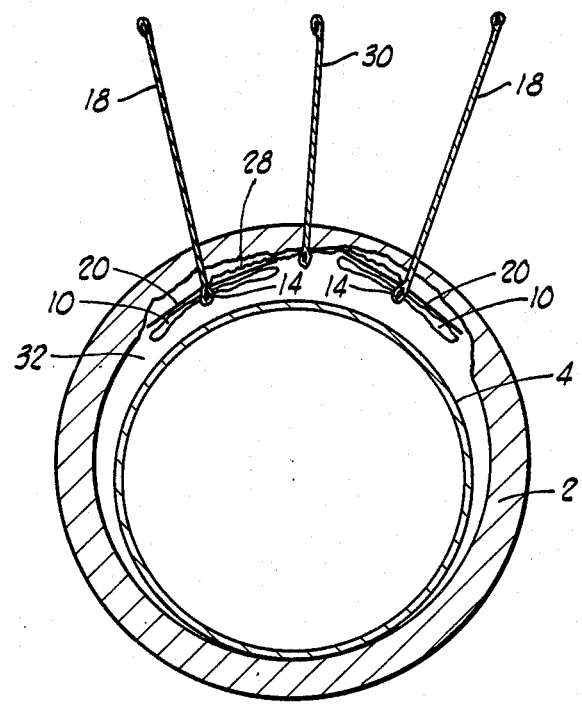
FIG. 7 is a end view of the grout containers of the present invention installed between a slip liner and sewer.

Referring to FIG. 7, an end view of the grout bags 10, grout protectors 20, grout bag cables 18, cross-connecting 28, guide cable 30 used to guide the grout bags 10 into the annular space 32 between the sewer 2 and slip liner 4 are shown. A guide cable 30 is installed in tension in the annular space 32 at the top of the slip liner 4 to act as a guide cable to center the rows of grout bags 10 about the guide cable 30 when the grout bag cables 30 are used to pull the grout bags 10 through the annular space 32.

Figure 8:
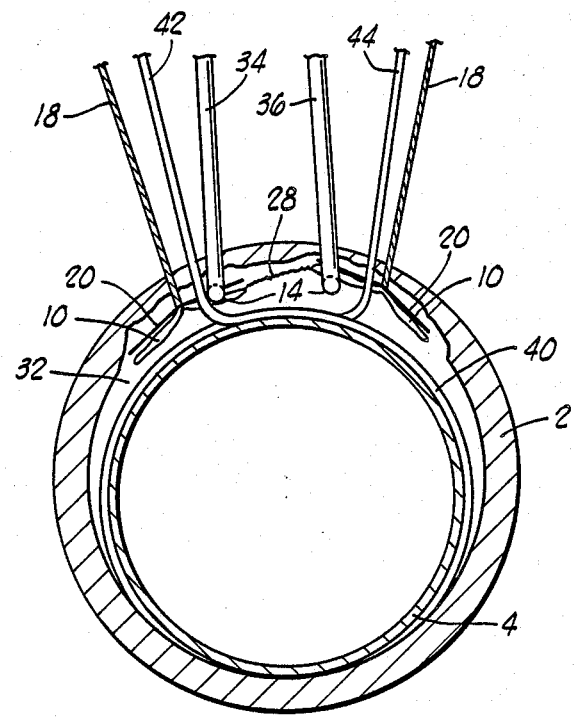
FIG. 8 is an end view of the grout containers and bulkhead grout containers installed between a slip liner and sewer.

Referring to FIG. 8, in end view, grout pipes 34 and 36 are shown being connected to the female connectors 14 of the grout bags 10 to provide a means of supplying grout to the grout bags 10 comprising the rows of grout bags acting as location and buoyancy control devices for the slip liner 4 in the sewer 2 during grouting operations. Also shown is an uninflated grout bag 40 having ends 42 and 44 wrapped about the slip liner 4 in the annular space 32 between the slip liner 4 and sewer 2. At the desired time, the ends 42 and 44 of bulkhead grout bag 40 are used to supply grout to inflate the bulkhead grout bag 40 to seal the annular space 32 between the slip liner 4 and sewer 2 so that grout may be pumped into the annular space 32 to completely fill the same.

The bulkhead grout bag 40 is similar in construction and materials with grout bag 10.

Further regarding FIG. 8, since the grout bags 10 have been installed in the annular space 32, the guide cable 30 has been removed in preparation for grouting operations.

Figure 9:
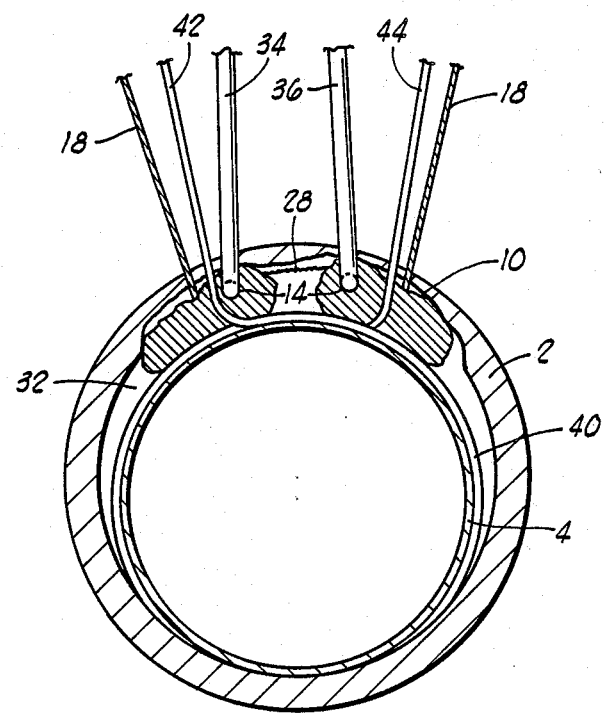
FIG. 9 is an end view of filled grout containers and an unfilled bulkhead grout container installed between a slip liner and sewer.

Referring to FIG. 9, in end view, grout bags 10 are shown inflated through the use of grout via grout pipes 34 and 36 in the annular space 32 to control the location of the slip liner 4 in the sewer 2. Once inflated, the grout bags 10 prevent the slip liner 4 from upward, flotation, or lateral movement in the annular space 32 with respect to the sewer 2. As shown, the bulkhead grout bag 40 is uninflated.

Figure 10:
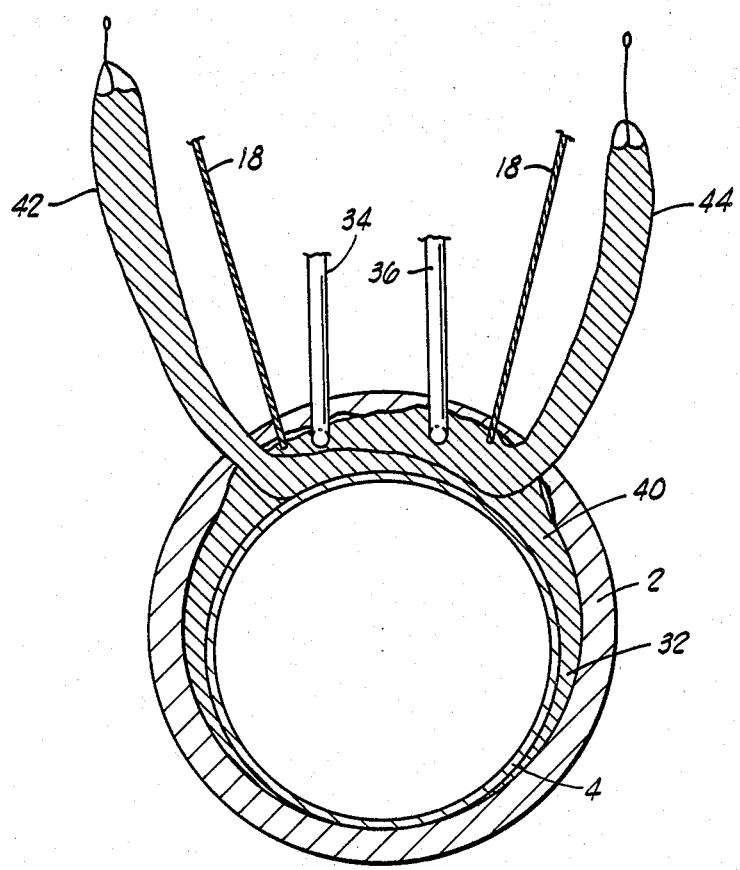
FIG. 10 is an end view of a filled bulkhead grout container installed between a slip liner and sewer.

Referring to FIG. 10, the bulkhead grout bag 40 is shown inflated through the ends 42 through the use of grout to fill and seal the annular space 32 between the slip liner 4 and sewer 2. The ends 42 and 44 of the bulkhead grout bag 40 are filled with grout and elevated over the slip liner 4 and sewer 2 to use the hydrostatic pressure of the grout to cause the bulkhead grout bag 40 to conform to the annular space 32 and grip the walls of the slip liner 4 and sewer 2 respectively.

OPERATION OF THE INVENTION

Referring to FIGS. 5 through 10, to prepare a slip liner 4 to be grouted into a sewer 2, the ends of grout bag cables 18 and a guide cable 30 are pulled through a sewer 2 between openings cut therein. The slip liner 4 is then positioned within the sewer 2. The grout bags 10 are then pulled through the annular space 32 between the slip liner 4 and sewer 2.

Next, the bulkhead grout bags 40 are installed in the annular space 32 between the slip liner 4 and sewer 2. Grout pipes 34 and 36 are connected to the rows of grout bags 10 and the grout bags 10 are filled with grout. The filled grout bags 10 are allowed to set for a period of time, typically twenty four (24) hours. Then the bulkhead grout bags 40 are filled with grout and allowed to set for a period of time, typically twenty four (24) hours. At this time any small leaks between the bulkhead grout bags 40 and the slip liner and sewer 2 are sealed using any suitable material to allow grouting of the annular space 32 to proceed through other grout injection points (not shown).

To fill the annular space 32 with low-density or foam cement the annular space 32 between the sewer 2 and slipliner 4 is sealed at various locations by any suitable means with grout pipes 34 and 36 being inserted into the annular space 32 so that grout may be injected thereinto through the grout pipes.

The low-density or foam cement to be used may be a neat portland cement and water cement which may be foamed by either adding nitrogen gas to the neat cement and water mixture until the specific gravity is less than 1.0 to any desired specific gravity which exhibits a forty eight (48) hour compressive strength of preferably greater than two hundred (200) pounds per square inch (p.s.i.) or adding a suitable surfactant, such as HOWCO SUDS, sold by Halliburton Services, a division of Halliburton Company, and mixing the neat cement and water mixture to entrain air in the mixture until the specific gravity of the mixture is less than 1.0 to any desired specific gravity which exhibits a forty eight (48) hour compressive strength of preferably greater than two hundred (200) pounds per square inch (p.s.i.)

Alternately, a cement having fifteen to fifty percent (15%–50%) pozzolan material, such as fly ash, may be substituted for the portland type cement. Additionally, rather than foam the cement/water mixture with either nitrogen gas or air, aluminum powder which will react with the cement to produce gas therein may be used. Also, commonly known and available cement retarders may be used in the cement/water mixture to provide additional pumping time before the cement begins to harden.

By using low-density of foam cements having a specific gravity less than 1.0 to fill the semi-annular void 14 between the sewer 10 and slipliner 12 the foam cement will tend to float on any water standing in the void 14 and will exert minimal hydrostatic pressure on the slipliner 12 to help minimize any risk of collapsing the same by the foam cement.

It will be obvious to those of ordinary skill in the art that improvements, additions, deletions or changes may be made to the present invention which are intended fall within the scope of the present invention.

It will be obvious to those skilled in the art that the present invention offers advantages over the prior art apparatus and methods in slip liner grouting.

Having thus described my invention, I claim:

1. A method of grouting a slipliner in a sewer, said slipliner forming an annular space between said slipliner and said sewer, said sewer having water therein thereby causing water to be present in said annular space prior to the grouting of said slipliner in said sewer, the method comprising the steps of:

sealing said annular space formed between said slipliner and sewer at a location;

inserting a grout injection pipe into said annular space formed between said slipliner and sewer to inject grout into said annular space;

mixing a grout having a density less than 1.0 specific gravity;

pumping the grout through the grout injection pipe into said annular space formed between said slipliner and sewer;

floating at least a portion of the grout on said water in said annular space between said slipliner and sewer thereby filling at least a portion of said annular space with grout; and ceasing the pumping of the grout into said annular space formed between said slipliner and sewer prior to the grout forming sufficient hydrostatic fluid pressure in said annular space between said slipliner and sewer to cause said slipliner to collapse.

2. The method of claim 1, wherein:

the step of mixing the grout comprises mixing a Portland cement and water to form a mixture and entraining nitrogen gas in the mixture of a Portland cement and water; and the step of pumping the grout comprises pumping the mixture of a Portland cement and water and entrained nitrogen gas into said annular space.

3. The method of claim 1 wherein:

the step of mixing the grout comprises mixing a pozzolan cement and water to form a mixture and entraining nitrogen gas in the mixture of a pozzolan cement and water; and the step of pumping the grout comprises pumping the mixture of a pozzolan cement and water and entrained nitrogen has into said annular space.

4. The method of claim 1 wherein;

the step of mixing the grout comprises mixing a Portland cement and water to form a mixture and entraining air in the mixture of a Portland cement and water; and the step of pumping the grout comprises pumping the mixture of a Portland cement and water and entrained air into said annular space.

5. The method of claim 1 wherein:

the step of mixing the grout comprises mixing a pozzolan cement and water to form a mixture and entraining nitrogen gas in the mixture of a pozzolan cement and water; and the step of pumping the grout comprises pumping the mixture of a pozzolan cement and water and entraining air into said annular space.

6. The method of claim 1 wherein the method further comprises the step of:

after the step of ceasing the pumping of the grout, allowing the grout to set until the grout has a compressive strength at forty eight hours of at least two hundred pounds per square inch.

7. The method of claim 1 further comprising the step of:

allowing the grout to set which has been pumped into said annular space; and pumping additional grout of any desired density into said annular space to substantially fill said annular space with grout.

* * * * *